(12) United States Patent
Faye-Lund et al.

(10) Patent No.: US 8,059,144 B2
(45) Date of Patent: Nov. 15, 2011

(54) GENERATING AND RESOLVING PIXEL VALUES WITHIN A GRAPHICS PROCESSING PIPELINE

(75) Inventors: Erik Faye-Lund, Oslo (NO); Jorn Nystad, Trondheim (NO); Eivind Liland, Trondheim (NO)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 12/659,285

(22) Filed: Mar. 3, 2010

(65) Prior Publication Data

US 2010/0265259 A1   Oct. 21, 2010

(30) Foreign Application Priority Data

Apr. 17, 2009 (GB) .................................. 0906691.1

(51) Int. Cl.
| | | |
|---|---|---|
| *G09G 5/02* | (2006.01) | |
| *G09G 5/36* | (2006.01) | |
| *G09G 5/397* | (2006.01) | |
| *G06T 1/60* | (2006.01) | |
| *G06T 9/00* | (2006.01) | |
| *G06T 1/20* | (2006.01) | |

(52) U.S. Cl. ........ 345/698; 345/545; 345/546; 345/555; 345/530

(58) Field of Classification Search .................. 345/419, 345/506, 530, 698, 545, 546, 555, 611
See application file for complete search history.

(56) References Cited

U.S. PATENT DOCUMENTS

| 6,044,178 A | 3/2000 | Lin |
| 6,614,448 B1 * | 9/2003 | Garlick et al. ................. 345/605 |
| 2006/0126736 A1 | 6/2006 | Shen |
| 2008/0008402 A1 | 1/2008 | Chang et al. |
| 2008/0303841 A1 * | 12/2008 | Newhall, Jr. .................. 345/587 |

OTHER PUBLICATIONS

Search Report for UK 0906691.1, dated Aug. 13, 2009.
J.D. Foley et al, *Computer Graphic Principles and Practice*, Second Edition in C, 1997, pp. 886-891.
F.I. Parke, "Simulation and Expected Performance Analysis of Multiple Processor Z-Buffer Systems" ACM 1980, pp. 48-56.

* cited by examiner

*Primary Examiner* — Hau Nguyen
(74) *Attorney, Agent, or Firm* — Nixon & Vanderhye P.C.

(57) ABSTRACT

A graphics processing apparatus 2 includes graphics processing pipelines 8. The graphics processing pipelines 8 include a programmable hardware stage 12, a pipeline memory 22 and writeback circuitry 16. Programmable resolving circuitry 18 is provided by the programmable hardware stage 12 within each pipeline and is responsive to one or more graphics program instructions to read pixel values at a first resolution generated within the pipeline memory 22 by pixel value generating circuitry 18 provided by the programmable hardware stage 12 and to perform a resolving operation upon these pixels values so as to generate pixel values at a second resolution. These pixel values at the second resolution are then written back to a frame buffer memory 6.

15 Claims, 4 Drawing Sheets

GENERATING AND RESOLVING PIXEL VALUES WITHIN A GRAPHICS PROCESSING PIPELINE

BACKGROUND OF THE INVENTION

1. Field of the Invention

This invention relates to graphics processing systems. More particularly, this invention relates to the processing circuitry provided within a graphics processing pipeline.

2. Description of the Prior Art

It is known to provide graphics processing systems, such as graphics processing units (CPUs), which include a graphics processing pipeline having multiple processing stages for performing functions such as fetching input data, processing the input data and writing output data back to a frame buffer memory. The graphics processing pipeline may be typically provided with some pipeline memory (e.g. a tile memory) for use in supporting such manipulations within the graphics processing pipeline prior to the writing back of pixel values to a frame buffer memory in which the complete frame of pixel values is assembled.

It is also known within the field of such graphics processing systems to perform resolving operations in which the resolution of input pixel values differs from the resolution of output pixel values. An example of such a resolving operation is down-sampling in which an image is generated at a higher resolution than the resolution at which it will be displayed and accordingly is down sampled to the display resolution. Typically such operations require the graphics processing pipeline to first generate the frame of pixel values at the higher resolution and store these within the frame buffer memory. These high resolution pixel values are then read back from the frame buffer memory and subject to a down-sampling operation before the lower resolution pixel values are written into the frame buffer memory prior to display. The writing of the pixel values at high resolution out to the frame buffer memory followed by the reading of these pixel values back into the graphics processing pipeline so they may be down sampled and written out at the lower resolution is wasteful in terms of memory band width and energy consumption.

Some graphics processing pipelines are known which provide fixed functionality down samplers within the graphics processing pipeline. An example of such a graphics processor is the Mali graphics processing unit designed by ARM Limited of Cambridge, England.

With the advent of more sophisticated graphics processing requirements accompanied by a requirement to reduce power consumption and increase operating speed, it is difficult to tolerate the requirement to write data to the frame buffer memory at a first resolution and then read this data back from the frame buffer memory for conversion to a second resolution when using a programmable resolving operation needed to support sophisticated graphics processing whilst also avoiding memory bandwidth and energy consumption constraints.

SUMMARY OF THE INVENTION

Viewed from one aspect the present invention provides a graphics processing apparatus for generating a frame of pixel data values to be stored in a frame buffer memory, said graphics processing apparatus comprising:

a graphics processing pipeline including:

(i) pixel value generating circuitry responsive to one or more first input parameters to generate pixel values at a first resolution for a region within said frame;

(ii) a pipeline memory coupled to said processing pipeline and configured to store said pixel values at said first resolution; and (iii) write back circuitry coupled to said pipeline memory and configured to write pixel values stored in said pipeline memory to said frame buffer memory; wherein said graphics processing pipeline further includes:

(iv) programmable resolving circuitry responsive to one or more graphics program instructions and one or more second parameters to read said pixel values at said first resolution from said pipeline memory and perform a resolving operation specified by said graphics program instruction and said one or more second parameters to generate pixel values at a second resolution to be written by said write back circuitry to said frame buffer memory, said second resolution being different to said first resolution.

The present technique recognises that in many cases, resolution changing resolving operations to be performed will require as inputs, pixel values local to the output pixel value. Thus, when the higher resolution pixel values are generated and stored within the pipeline memory of the graphics processing pipeline, in many real world resolving operations the input pixel values needed to generate the output pixel values of the different resolution will already be present within the pipeline memory and there is no need for an intervening writeback to the frame buffer memory and read from the frame buffer memory. The present technique recognises that the capabilities of the graphics processing pipeline can be expanded to permit it to both generate pixel values in the pipeline memory at a first resolution and then further process these pixel values within the pipeline memory using a resolving operation specified by one or more graphics program instructions to generate output pixel values at a second resolution that is different from the first resolution. These output pixel values can then be written back to the frame buffer memory by the write back circuitry.

It will be appreciated that the first resolution and the second resolution in a general sense differ. However, in many useful embodiments of the present technique the second resolution is lower than the first resolution.

In the context of the second resolution being lower than the first resolution, the resolving circuitry may read a plurality of pixel values at the first resolution as inputs to the resolving operation to form one or more pixel values at the second resolution.

The programmable resolving operation specified by the one or more graphics program instructions and incorporating a resolution change to the pixel values generated and stored in the pipeline memory by the pixel value generating circuitry can take a variety of different forms including, for example, a multi-sampled anti-aliasing operation; a multi-sampled high dynamic range rendering operation; a linear blending operation; a deferred shading operation; a format conversion operation; a YUV-conversion operation; and compression of pixel values.

The pixel value generating circuitry will typically comprise programmable graphics processing circuitry such that it is able to support different types of pixel value generation. In this context, the pixel value generating circuitry and the programmable resolving circuitry may be arranged to execute respective graphics processing threads upon data values within the pipeline memory without requiring a write back and read from the frame buffer memory.

The pixel value generating circuitry and the programmable resolving circuitry may be provided as separate circuit elements. However, as will be appreciated by those in this technical field, it is often more efficient if this circuitry is at least partially formed of shared programmable graphics processing circuitry. As an example, both the pixel value generating circuitry and the programmable resolving circuitry may be required to perform add operations and it will be efficient if adder hardware is shared between the pixel value generating circuitry and the programmable resolving circuitry. It is also possible that the pixel value generating circuitry and the programmable resolving circuitry may comprise the same physical circuit blocks that are differently programmed to serve as the pixel value generating circuitry and the programmable resolving circuitry.

The operation of the resolving operation may be achieved by executing one or more graphics processing threads using the programmable graphics processing circuitry before pixel values having the second resolution are written to the frame buffer memory. Thus, pixel values generated within the graphics processing pipeline and stored within the pipeline memory are further processed by the resolving operation to form a different resolution output using graphics processing threads executed by that graphics processing pipeline without requiring a write back to the frame buffer memory.

The usefulness of the present technique is further enhanced when the resolving operation supports at least one of multiple render target inputs and multiple render target outputs. The programmable nature of the resolving circuitry has an improved capability to perform real world desired resolving operations when such multiple rendered target operation is supported.

In some embodiments the resolving operation may serve to received a plurality of input parameters and generate a single output parameter thereby serving as a many-to-one type of processing operation. Resolving operations are often of this form and a large proportion of the advantage to be achieved by these techniques may be realised by supporting this type of operation.

It will be appreciated that the graphics processing pipeline will typically include an instruction decoder responsive to graphics program instructions to perform its processing operations. In accordance with the present techniques, this instruction decoder may be modified to control operations that serves: (i) to generate said pixel values at said first resolution; (ii) to store said pixel values at said first resolution; (iii) to read said pixel values at said first resolution from said pipeline memory and to perform said resolving operation to generate pixel values at a second resolution; and (iv) to write pixel values stored in said pipeline memory to said frame buffer memory.

It will be appreciated that the pipeline memory can be formed in a variety of different ways. The pipeline memory may store instruction information as well as pixel values in some embodiments. The pipeline memory may be dedicated to support certain regions of pixel values being processed in a sequential manner, such as within a tile-based graphics processing unit, or may be more flexibly provided as a random access memory resource to be used by the graphics processing pipeline as appropriate to the particular operation it is performing at that time. However, efficiency may be improved when the pipeline memory is dedicated to storing pixel values generated by the pixel value generating circuitry and the programmable resolving circuitry as this tends to permit a more direct coupling between the pipeline memory and the graphics processing pipeline.

Viewed from another aspect the present invention provides a graphics processing apparatus for generating a frame of pixel data values to be stored in a frame buffer memory, said graphics processing apparatus comprising:
  graphics processing pipeline means including:
    (i) pixel value generating means, responsive to one or more first input parameters, for generating pixel values at a first resolution for a region within said frame;
    (ii) pipeline memory means coupled to said processing pipeline for storing said pixel values at said first resolution; and
    (iii) write back means coupled to said pipeline memory for writing pixel values stored in said pipeline memory means to said frame buffer memory; wherein
    said graphics processing pipeline means further includes:
    (iv) programmable resolving means, responsive to one or more graphics program instructions and one or more second parameters, for reading said pixel values at said first resolution from said pipeline memory means and for performing a resolving operation specified by to said graphics program instruction and said one or more second parameters to generate pixel values at a second resolution to be written by said write back means to said frame buffer memory, said second resolution being different to said first resolution.

Viewed from a further aspect the present invention provides a graphics processing method of generating within a graphics processing pipeline a frame of pixel data values to be stored in a frame buffer memory, said graphics processing method comprising the steps of:
  (i) in response to one or more first input parameters, generating pixel values at a first resolution for a region within said frame;
  (ii) storing said pixel values at said first resolution within a pipeline memory within said graphics processing pipeline;
  (iii) in response to one or more graphic program instructions and one or more second parameters, reading said pixel values at said first resolution from said pipeline memory and performing a resolving operation specified by said graphics program instruction and said one or more second parameters to generate pixel values at a second resolution to be written by said write back means to said frame buffer memory, said second resolution being different to said first resolution; and
  (iv) writing pixel values stored in said pipeline memory to said frame buffer memory.

Viewed from a further aspect the present invention provides a computer program storage medium storing a computer program for controlling a graphics processing apparatus to perform a graphics processing method of generating within a graphics processing pipeline a frame of pixel data values to be stored in a frame buffer memory, said graphics processing method comprising the steps of:
  (i) in response to one or more first input parameters, generating pixel values at a first resolution for a region within said frame;
  (ii) storing said pixel values at said first resolution within a pipeline memory within said graphics processing pipeline;
  (iii) in response to one or more graphic program instructions and one or more second parameters, reading said pixel values at said first resolution from said pipeline memory and performing a resolving operation specified by said graphics program instruction and said one or more second parameters to generate pixel values at a second resolution to be written by said write back means to said frame buffer memory, said second resolution being different to said first resolution; and
  (iv) writing pixel values stored in said pipeline memory to said frame buffer memory.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
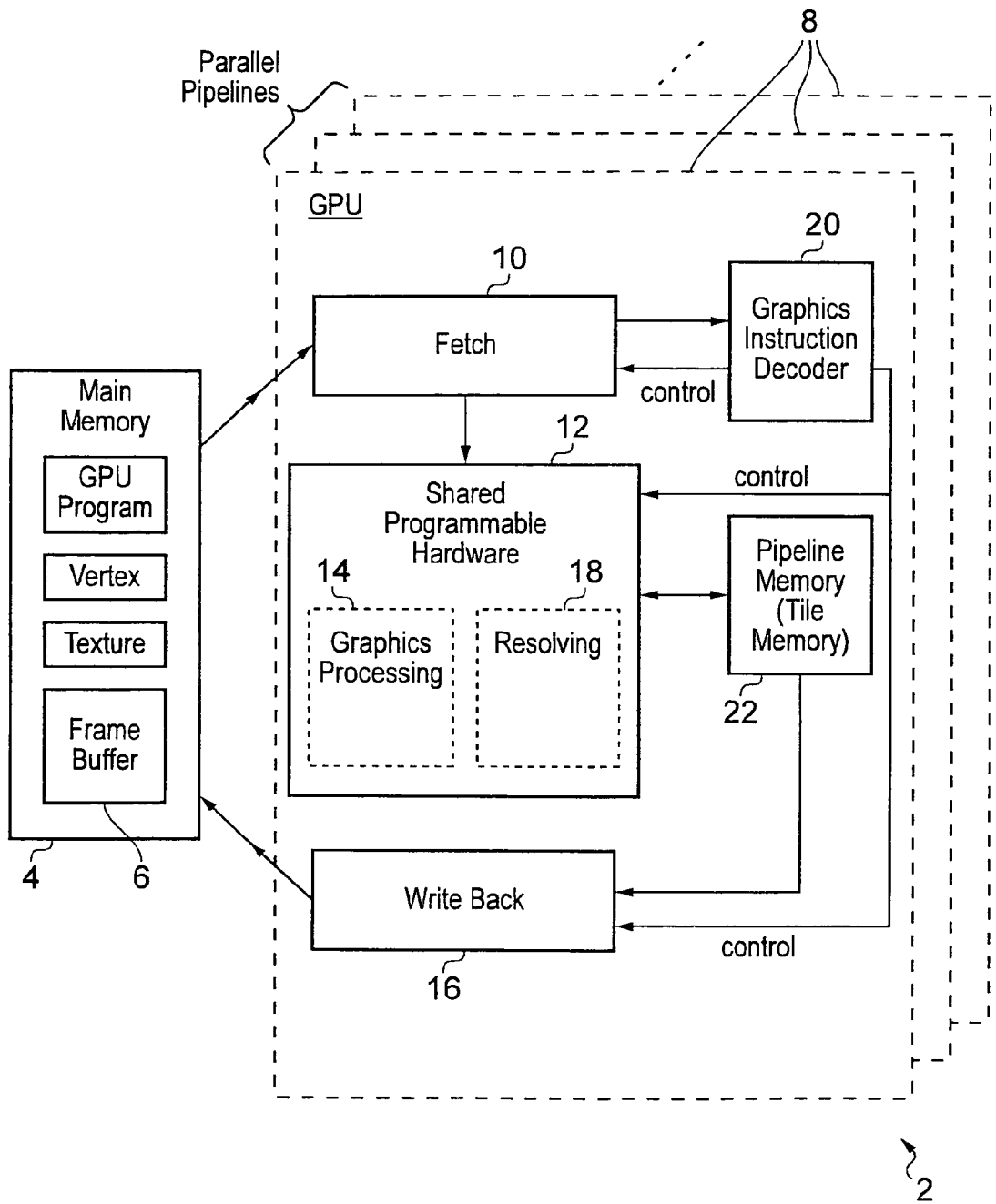
FIG. 1 schematically illustrates a graphics processing apparatus coupled to a memory.

FIG. 1 illustrates a graphics processing unit 2 comprising multiple graphics processing pipelines 8 arranging in parallel. The graphics processing unit 2 is coupled to a main memory 4 which stores a frame of pixel values in a frame buffer memory 6. The main memory 4 also stores vertex data and texture data for use as inputs in generating pixel values representing a graphics image as well as graphics processing unit program instructions.

The graphics processing pipelines 8 illustrated in FIG. 1 each include multiple pipeline stages. These stages include a fetch stage 10, a programmable hardware stage 12 and a writeback stage 16. The programmable hardware stage 12 can be configured by appropriate graphics program instructions to provide pixel value generating circuitry 14 and resolving circuitry 18. The programmable hardware stage 12 supports multi-threaded processing and so can serve both these functions and others. A graphics instruction decoder 20 is responsive to the graphics program instructions fetched from the main memory 4 to control the pipeline stages 12, 14 to perform the desired graphics processing operations. The graphics program instructions can include a combined generating program which serves to control the programmable hardware stage 12 to generate pixel values at a first resolution which are then stored in a pipeline memory 22 before a resolving program controls the programmable hardware stage 12 to read those pixel values and perform a resolving operation to generate pixel values at a second resolution which are then written back to the frame buffer memory 6 by the writeback stage 16 (either directly or after first being stored in the pipeline memory 22).

The programmable hardware stage 12 executing the pixel generating program (i.e. the pixel generating circuitry 14) serves to generate pixel values from the vertex data and the texture data read from the main memory 4. These pixel values are stored within the pipeline memory 22. The generated pixel values stored at this time have a first resolution (such as a high resolution). The programmable hardware stage 12 executing the resolving program as controlled by the graphics instruction decoder 20 then reads the pixel values at the first resolution from the pipeline memory 22 and performs a resolving operation upon these pixel values. The resolving operation may include one or more of a multi-sampled anti-aliasing operation, a multi-sampled high dynamic range rendering operation, a linear blending operation, a deferred shading operation, a format conversion operation, a YUV conversion operation and/or compression of pixel values (e.g. the frame buffer can be in compressed form to save bandwidth when performing render-to-texture and when later texturing using that data). The above are examples of resolving operations which are performed and other such operations will be familiar to those in this technical field. The result of the resolving operation performed by the resolving program is pixel values at a second resolution that is different from the first resolution. These pixel values may be written back to the pipeline memory 22 or passed directly to the write back circuitry 16. The write back circuitry 16 writes the pixel values at the second resolution to the frame buffer 6 for subsequent display.

An example of the resolving operation is an anti-aliasing operation in which edges of a graphics object are smoothed in an anti-aliasing operation in which four pixel values at the first high resolution are read and used to generate each pixel value at the lower second resolution. Thus, there is a four-to-one down sampling together with an anti-aliasing operation performed by the programmable hardware stage 12 executing the resolving program (i.e. resolving circuitry 18). It is possible that the resolving operation could be of a different form than the above many-to-one operations.

The resolving operation makes use of the generated pixel values produced by the pixel value generating operation in the pipeline memory 22 as its inputs without requiring those pixel values to be written back to the frame buffer memory 6 and then read back through the graphics processing pipeline 8 in order to perform the resolving operation. The resolving operation performed in accordance with the present technique recognises that the data requirements are often local such that the inputs to a resolving operation will already be present within the pipeline memory 22 when the graphics processing unit is generating the higher resolution representation (or at least different resolution representation) of the portion of the image concerned and storing this representation within the pipeline memory 22. As the resolving operation does not in practice need to access pixel values other than those already present within the pipeline memory 22, there is no need for the intervening write back to the frame buffer memory 6 as the flexibility of being able to use input pixel values from anywhere within that frame buffer in order to perform the resolving operation is not in fact necessary. The programmable hardware stage 12 can thus perform a wide variety of resolving operations with reduced memory bandwidth and energy consumption.

The graphics processing circuitry 14 and the programmable resolving circuitry 18 may in practice be provided by shared hardware in the form of programmable hardware stage 12. This programmable hardware stage 12 is controlled by control signals generated by the graphics instruction decoder 20 in response to received graphics program instructions. The programmable hardware stage 12 can execute a sequence of graphics processing threads to first generate and then post-process pixel values within the pipeline memory 22.

Figure 2:
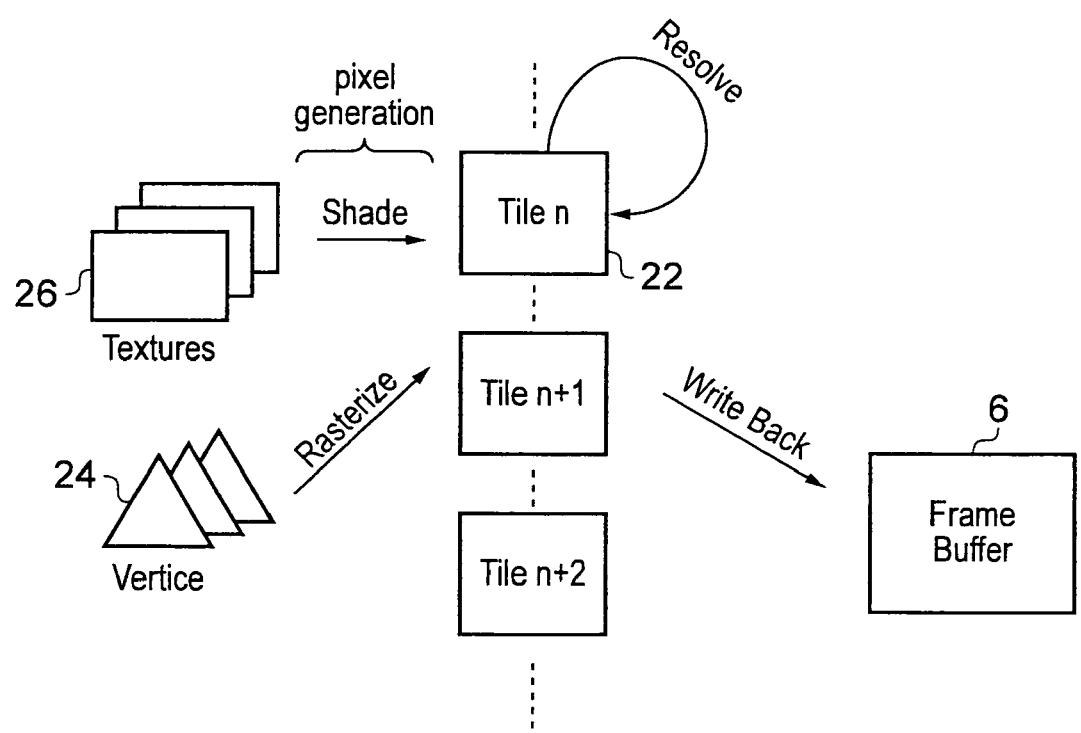
FIG. 2 schematically illustrates the operations of generating pixel values within a pipeline memory and then performing a resolving operation upon those pixel values within the pipeline memory before a write back operation to a frame buffer.

FIG. 2 schematically illustrates processing operations that are performed. Input parameters, such as data defining vertices 24 and textures 26, are read from the main memory 4 into a graphics processing pipeline 8. The pixel generation circuitry in the form of the programmable hardware stage 12 then generates pixel values which are stored on a tile-by-tile basis into a pipeline memory 22. It will be appreciated that this example relates to a tile-based graphics processing unit.

The pixel values generated by the pixel generating circuitry 14 (provided as above) have a first resolution (such as four times the resolution ultimately required) as they are written into the pipeline memory 22. The resolving circuitry 18 (provided by program controlled operation of the programmable hardware stage 12) then reads as its inputs these pixel values at the first resolution and subjects them to a resolving operation, such as one of those previously discussed. The resulting resolved pixel values are then, in this example, written back into the pipeline memory 22 at the second resolution (such as at a quarter of the first resolution). A write back process then writes the pixel values at the second resolution (the desired down sampled resolution) out to the frame buffer memory 6 from where the pixel values may be used to drive an appropriate display at the desired resolution.

Figure 3:
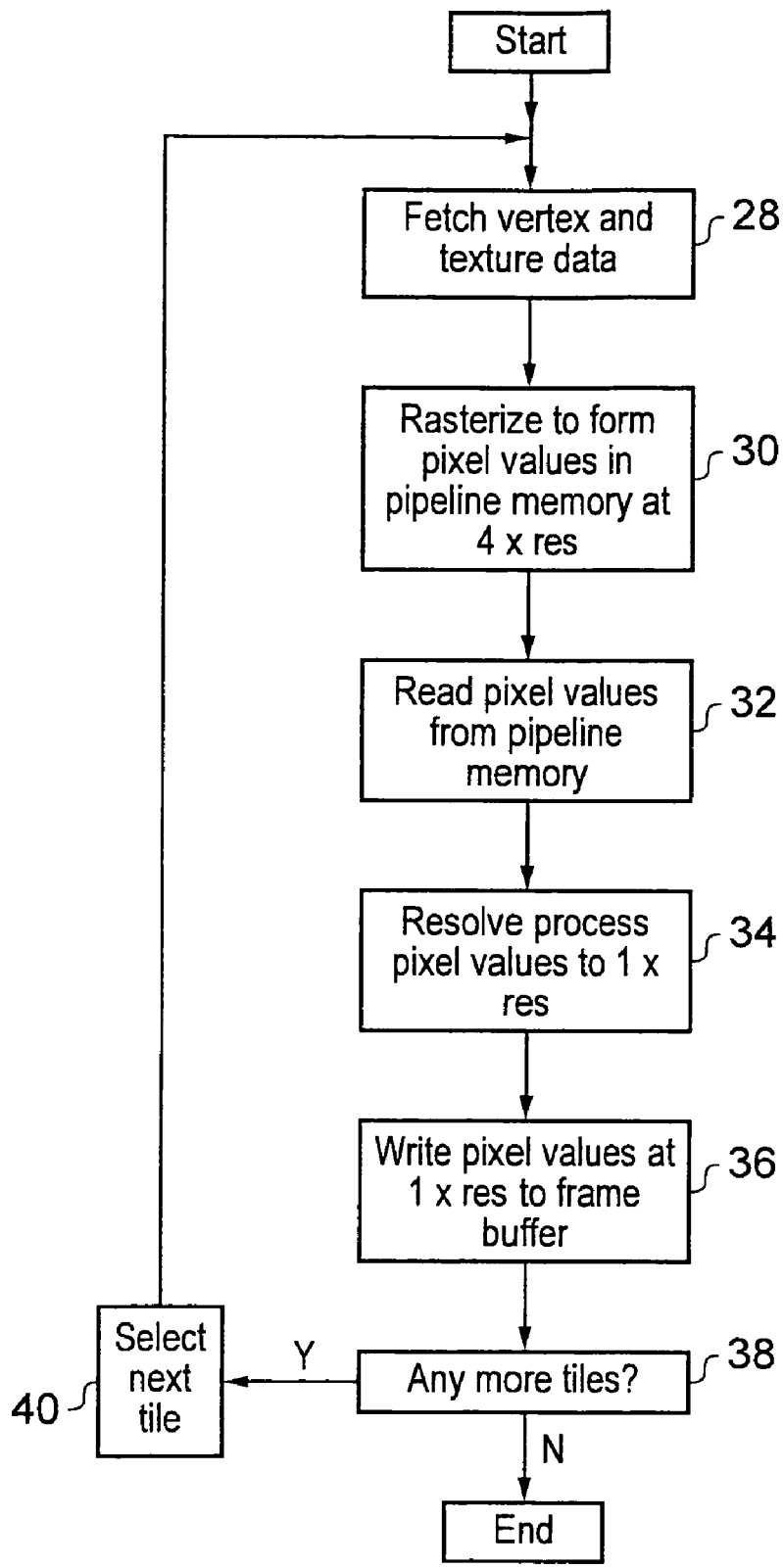
FIG. 3 is a flow diagram schematically illustrating a method of processing graphics in accordance with FIG. 2.

FIG. 3 is a flow diagram schematically illustrating the processing described above. At step 28 vertex and texture data is fetched from the main memory 4. At step 30 the pixel generating circuitry 14 rasterizes the graphics objects defined by the vertex and texture data to form pixel values at four times (4×) the desired resolution with these being written into the pipeline memory 22 at this 4× resolution. Step 32 then reads the pixel values from the pipeline memory 22 at the 4× resolution as input to the resolving circuitry 18 and step 34 performs the resolving operation on these input pixel values to produce output pixel values at the desired 1× resolution. At step 36 the pixel values at this 1× resolution are written out to the frame buffer memory 6.

Step 38 determines whether or not there are any more tiles corresponding to regions of graphics data which require processing. If there are more tiles to be processed, then step 40 selects the next tile and processing returns to step 28 otherwise processing ends.

Figure 4:
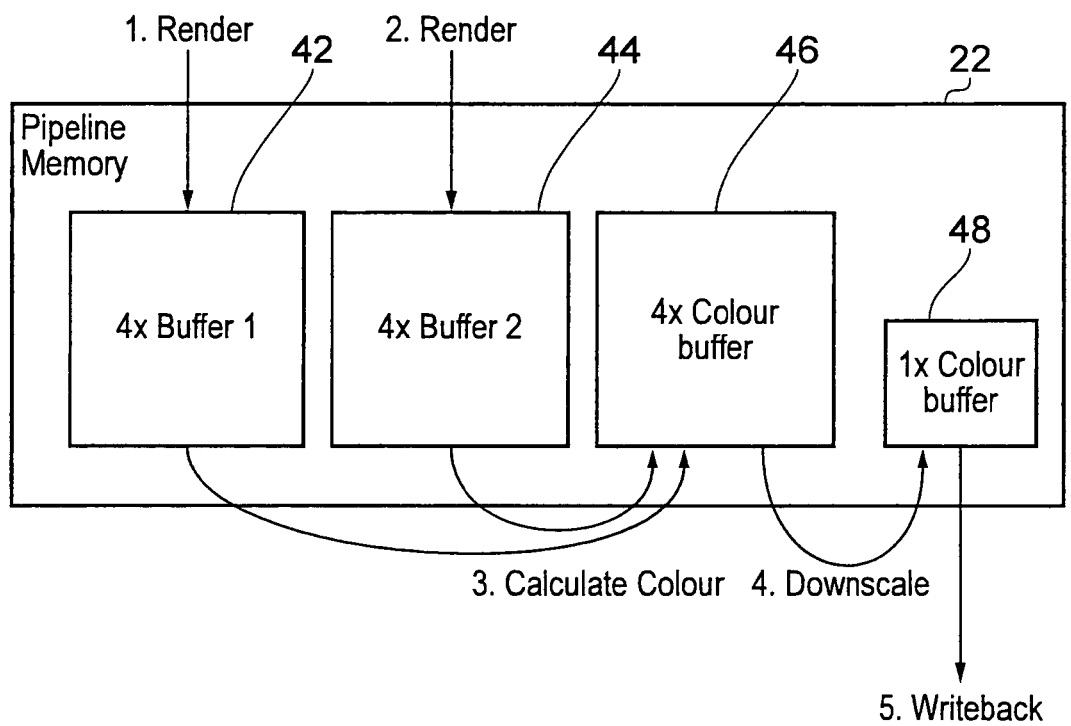
FIG. 4 schematically illustrates the use of a pipeline memory to perform a deferred shading operation.

FIG. 4 schematically illustrates data being written to and read from the pipeline memory 28 as part of a deferred shading operation. A first rendering operation (graphics processing thread) serves to write a region of pixel values 42 at a 4× resolution in the pipeline memory 22. A second rendering operation then serves to generate a second region of pixel values 44 at this 4× resolution within the pipeline memory 22. The above two graphics processing operations may be performed sequentially or in parallel depending upon the capabilities of the graphics processing pipeline 8.

The next stage in the processing is that the regions of pixel values 42, 44 are both read as inputs and used to calculate colour values so as to populate a colour buffer region of pixel values 46 still at the 4× resolution. Finally, a resolving operation is performed which reads the pixel values at the 4× resolution within the colour buffer 46 as inputs and generates a downscaled output region of pixel values 48 at a 1× resolution. The downscaled region of pixel values 48 is written back to the frame buffer memory 6.

The downscale operation illustrated in FIG. 4 is one of a number of different programmable resolving operations that may be performed by the resolving circuitry 14.

At a general level the above described technique can be considered as adding a new programmable capability into the graphics processing pipeline 8 in the form of a resolving operation direct from the pipeline memory 22 that serves to address a number of problems, such as memory bandwidth and memory access energy consumption. In this way a resolving operation which changes the resolution of the pixel values can be added prior to write back so as to achieve post-processing of generated pixel values without requiring an intervening write back to the frame buffer memory. The resolving operations can include, for example, multi-sample buffer resolving with tone-mapping applied to each sample before down-sampling thereby resulting in an improved anti-aliased result for high dynamic range rendering.

One way of controlling this new hardware is by extending the Open GL ES Shading Language with a new shader type and new built-in variables. Thus, support for this new hardware may be fitted within the existing shader-programming model. The Open GL ES interface can be extended with a new shader type that is not attached to the program object but rather to the frame-buffer object.

Before a tile of pixel values within a tile based graphics processing unit (as stored within the pipeline memory 22) is written back to the frame buffer memory 6, a rescheduling of a number of graphics processing threads can be performed. Each of these rescheduled graphics processing threads can then result in a physical pixel to be written back to the frame buffer memory 6. The programming model can be a many-to-one model in which multiple samples are passed in as parameters to these rescheduled graphics processing threads and a single parameter is written back to the frame buffer memory 6. Both the inputs to and the outputs from these rescheduled graphics processing threads may be formed so as to support multiple render targets thereby improving the flexibility of use of this technique.

The new shader type introduced to support the control of the resolving circuitry 14 can be a variant of existing fragment shaders. The new shader type may have a set of built-in variables: "float2 gl_SamplePosition[ ]", "float4 gl_SampleColor[ ]", "int gl_SampleCount".

Forming the shader type in this way provides ready support for already built-in fragment shader features, such as texturing, which may be useful for operations including gamma correction. The new shader type extends the existing shader types by introducing a mechanism that attaches a shader to a frame buffer object. Accordingly, the present technique transforms a mechanism like this:

Render to 4×MSAA (glBindFrameBuffer, glDrawTexture)
    Resolve 4×MSAA to no MSAA. (glCopyTexSubImage2D)
    Use no MSAA as texture (glBindTexture)

To this:

Render to 4×MSAA internally, but resolve directly (glBindFramebuffer, glDrawTexture)
    Use no MSAA as texture (glBindTexture)

This implies an internal format of the texture that is of higher precision than the external format, and removes an explicit resolve pass.

In order to add multiple render target support to the inputs, the sample-position and sample-colour built-ins in the above mechanisms may be extended to two-dimensional arrays and a fourth built-in added "int gl_SampleBufferCount" that indicates the direction of the second dimension of the previous arrays. Multiple render target support enables mechanisms such as deferred lighting to be explicitly performed. In order to support render to ETC/DXT as a feature, bitwise operations on integers may be added to the processing capabilities of the graphics processing pipelines 8.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A graphics processing apparatus for generating a frame of pixel data values to be stored in a frame buffer memory, said graphics processing apparatus including a graphics processing pipeline, said pipeline including:

(i) pixel value generating circuitry, responsive to one or more first input parameters, configured to generate pixel values at a first resolution for a region within said frame;

(ii) a pipeline memory coupled to said processing pipeline and configured to store said pixel values at said first resolution; and (iii) write back circuitry coupled to said pipeline memory and configured to write pixel values stored in said pipeline memory to said frame buffer memory; and (iv) programmable resolving circuitry, responsive to one or more graphics program instructions and one or more second parameters, configured to read said pixel values at said first resolution from said pipeline memory and to perform a resolving operation specified by said graphics program instruction and said one or more second parameters to generate pixel values at a second resolution to be written by said write back circuitry to said frame buffer memory, said second resolution is different from said first resolution, wherein at said first resolution said region within said frame is represented by a first number of pixels and at said second resolution said region within said frame is represented by a second number of pixels.

2. A graphics processing apparatus as claimed in claim 1, wherein said second resolution is lower than said first resolution.

3. A graphics processing apparatus as claimed in claim 2, wherein said resolving circuitry reads a plurality of pixels values at said first resolution as inputs to said resolving operation to form one or more pixel values at said second resolution.

4. A graphics processing apparatus as claimed in claim 2, wherein said resolving operation is one or more of:
a multi-sampled anti-aliasing operation;
a multi-sampled high dynamic range rendering operation;
a linear blending operation;
a deferred shading operation;
a format conversion operation;
a YUV-conversion operation; and
compression of pixel values.

5. A graphics processing apparatus as claimed in claim 1, wherein said pixel value generating circuitry comprises programmable graphics processing circuitry and said pixel value generating circuitry and said programmable resolving circuitry execute respective graphics processing threads.

6. A graphics processing apparatus as claimed in claim 5, wherein said pixel value generating circuitry and said programmable resolving circuitry share at least a portion of said programmable graphics processing circuitry.

7. A graphics processing apparatus as claimed in claim 6, wherein said programmable graphics processing circuitry is configured under software control to serve as said pixel value generating circuitry or as said programmable resolving circuitry.

8. A graphics processing apparatus as claimed in claim 5, wherein one or more graphics processing threads are executed upon said pixel values at said first resolution by said programmable graphics processing circuitry to perform said resolving operation to generate said pixel values at said second resolution, before pixel values at said second resolution are written to said frame buffer memory.

9. A graphics processing apparatus as claimed in claim 1, wherein said resolving operation supports at least one of:
multiple render target inputs; and
multiple render target outputs.

10. A graphics processing apparatus as claimed in claim 1, wherein said resolving operation receives a plurality of input parameters to and generates a single output parameter.

11. A graphics processing apparatus as claimed in claim 1, wherein said graphics processing pipeline includes an instruction decoder responsive to a combined generate and resolve graphics instruction to control said graphics pipeline to:

(i) to generate said pixel values at said first resolution;

(ii) to store said pixel values at said first resolution;

(iii) to read said pixel values at said first resolution from said pipeline memory and to perform said resolving operation to generate pixel values at a second resolution; and (iv) to write pixel values stored in said pipeline memory to said frame buffer memory.

12. A graphics processing apparatus as claimed in claim 1, wherein said pipeline memory is dedicated to storing pixel values generated by said pixel value generating circuitry and said programmable resolving circuitry.

13. A graphics processing apparatus for generating a frame of pixel data values to be stored in a frame buffer memory, said graphics processing apparatus including a graphics processing pipeline, said pipeline comprising:

(i) pixel value generating means, responsive to one or more first input parameters, for generating pixel values at a first resolution for a region within said frame;

(ii) pipeline memory means, coupled to said processing pipeline, for storing said pixel values at said first resolution;

(iii) write back means, coupled to said pipeline memory, for writing pixel values stored in said pipeline memory means to said frame buffer memory; and (iv) programmable resolving means, responsive to one or more graphics program instructions and one or more second parameters, for reading said pixel values at said first resolution from said pipeline memory means and for performing a resolving operation specified by to said graphics program instruction and said one or more second parameters to generate pixel values at a second resolution to be written by said write back means to said frame buffer memory, said second resolution is different from said first resolution, wherein at said first resolution said region within said frame is represented by a first number of pixels and at said second resolution said region within said frame is represented by a second number of pixels.

14. A graphics processing method of generating, within a graphics processing pipeline, a frame of pixel data values to be stored in a frame buffer memory, said graphics processing method comprising the steps of:

(i) in response to one or more first input parameters, generating pixel values at a first resolution for a region within said frame;

(ii) storing said pixel values at said first resolution within a pipeline memory within said graphics processing pipeline;

(iii) in response to one or more graphic program instructions and one or more second parameters, reading said pixel values at said first resolution from said pipeline memory and performing a resolving operation specified by said graphics program instruction and said one or more second parameters to generate pixel values at a second resolution, said second resolution is different from said first resolution; and (iv) writing pixel values stored in said pipeline memory to said frame buffer memory, wherein at said first resolution said region within said frame is represented by a first number of pixels and at said second resolution said region within said frame is represented by a second number of pixels.

15. A non-transitory computer readable storage medium storing a computer program for controlling a graphics processing apparatus to perform a graphics processing method of generating within a graphics processing pipeline a frame of pixel data values to be stored in a frame buffer memory, said graphics processing method comprising the steps of:
- (i) in response to one or more first input parameters, generating pixel values at a first resolution for a region within said frame;
- (ii) storing said pixel values at said first resolution within a pipeline memory within said graphics processing pipeline;
- (iii) in response to one or more graphic program instructions and one or more second parameters, reading said pixel values at said first resolution from said pipeline memory and performing a resolving operation specified by said graphics program instruction and said one or more second parameters to generate pixel values at a second resolution, said second resolution is different from said first resolution; and
- (iv) writing pixel values stored in said pipeline memory to said frame buffer memory, wherein at said first resolution said region within said frame is represented by a first number of pixels and at said second resolution said region within said frame is represented by a second number of pixels.

* * * * *